US008670161B2

(12) United States Patent
Salgado et al.

(10) Patent No.: US 8,670,161 B2
(45) Date of Patent: Mar. 11, 2014

(54) DRIVER THAT PRESENTS CONTEXT SENSITIVE INFORMATION ABOUT DEVICE FEATURES

(75) Inventors: David L. Salgado, Victor, NY (US);
Bradley W. Smith, Castile, NY (US);
Vibhaker Moudgil, Macedon, NY (US);
John Y. Zhang, Webster, NY (US);
Likang Guo, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2280 days.

(21) Appl. No.: 11/273,132

(22) Filed: Nov. 14, 2005

(65) Prior Publication Data
US 2007/0109575 A1 May 17, 2007

(51) Int. Cl.
*H04N 1/23* (2006.01)
(52) U.S. Cl.
USPC ............................ 358/300; 358/1.9; 358/1.14
(58) Field of Classification Search
USPC ................. 358/1.11–1.18; 715/705
See application file for complete search history.

(56) References Cited

U.S. PATENT DOCUMENTS

| 6,452,607 | B1 | 9/2002 | Livingston |
| 6,646,758 | B1 | 11/2003 | Anderson et al. |
| 6,748,183 | B2 | 6/2004 | Edmonds |
| 2001/0043346 | A1* | 11/2001 | Roztocil et al. ................ 358/1.9 |
| 2002/0078160 | A1* | 6/2002 | Kemp et al. ................... 709/208 |
| 2003/0184781 | A1* | 10/2003 | Laughlin ...................... 358/1.13 |
| 2005/0050013 | A1* | 3/2005 | Ferlitsch ........................... 707/3 |
| 2007/0109575 | A1* | 5/2007 | Salgado et al. .............. 358/1.13 |
| 2007/0113164 | A1* | 5/2007 | Hansen et al. ................ 715/500 |
| 2007/0253020 | A1* | 11/2007 | Hull et al. .................... 358/1.15 |

* cited by examiner

*Primary Examiner* — Benny Q Tieu
*Assistant Examiner* — Marcellus Augustin
(74) *Attorney, Agent, or Firm* — Ronald E. Prass, Jr.; Prass LLP

(57) ABSTRACT

A printer driver enables a user to determine whether the features that are required to print a specified job are available to a selected network printer. The printer driver queries the selected printer to acquire the current status and other relevant information for each feature that is required to print the job, then provides the results of the query at a user interface. Accordingly, if any of the required features are unavailable to the selected printer, the user can print the job using another printer or take some other appropriate action.

16 Claims, 5 Drawing Sheets

DRIVER THAT PRESENTS CONTEXT SENSITIVE INFORMATION ABOUT DEVICE FEATURES

TECHNOLOGY

This relates generally to operating the features that are available to an electronic device and more particularly, to an electronic device driver that makes information about a device feature available where the settings associated with the feature are entered at the user interface.

BACKGROUND

Computing systems often include electronic devices that are controlled by device drivers that run on host computers. Generally, device drivers are software programs that translate data that is generated at the host to commands that are recognized by the associated device. Device drivers often receive input at graphical user interfaces that represent the available options and features as text and graphic images, which are displayed on video monitors linked to the host. Users control the device from the host by entering data at the user interface.

Electronic devices offer a wide variety of options that operate according to user selected settings. For example, digital printers usually have media in various sizes, weights and orientations, which are stored in different output trays and users are allowed to request the size and type of output media that is used to print the job. Some drivers show the current status of the available options, which allows users to avoid submitting print requests with requested output that is not currently available to the printer. For example, a printer driver may list all of the types of paper that can potentially loaded into the media trays with an indicator next to the paper sizes that are (or are not) currently stored in the available trays.

Electronic device also offer "features" that automatically combine options to perform a desired function. For example, a printer may offer a "booklet" feature that sequentially captures images and provides creates duplex output with multiple images printed on a single sheet of paper. Such a feature may require automatically reducing the size of the input images and drawing paper from a particular media source, such as, for example, a tray that will feed paper having the selected size and weight into the machine in the appropriate direction. Quite often, whether a device feature is available will depend upon the condition of two or more device options. For example, the above described booklet feature may require an operable image reduction option and a sufficient amount of the selected type of media to be stored in a tray that feeds paper into the printer in the "long edge feed" direction.

Some device drivers enable users to separately check the condition of the available options. Unfortunately, device drivers to not currently enable users to access the location of the driver where device features are selected to determine whether the current condition of each required device option will actually enable the user to operate the feature. Accordingly, if the user does not identify every option that is required to use the feature and check its condition s/he will run the risk that the job will not print or that if it prints it will print incorrectly.

It is preferable to be able to provide information about an electronic device feature at the location of the device driver where the user enters the settings for the feature.

REFERENCES

U.S. Pat. No. 6,452,607 discloses a help feature for a user interface that includes a help control, such as a graphical button, displayed adjacent to a control option of the user interface. The help control references the control option for obtaining help information about the control option. The help control is displayed, and remains displayed, in response to a detected noteworthy status of the control option. Specifically, the help control is displayed automatically, without user interaction, in the event the control option is disabled and noteworthy. Alternatively, the control option is displayed in the event it is enabled and noteworthy. The help control is displayed non-intrusively relative to other elements of the user interface. Importantly, when the help control is selected by the user, context-sensitive help information is displayed describing, respectively, why the control option is disabled or why it is enabled and noteworthy.

U.S. Pat. No. 6,646,758 discloses a printer that is configured to overcome potential print job configuration errors by gathering current printer configuration status data with respect to the available print media and comparing the current print media to the requested print media to make decisions that are likely to provide the user with the appropriate print media. The methods and arrangements provide for additional print media handling capabilities associated with certain types of orientation-dependent print media and simplex and/or duplex printing requirements. The user is only asked to manually intervene when the print media is unavailable or cannot be readily determined from the print job. When this occurs, the additional configuration information that is gathered can be provided to the user to assist with the manual intervention.

U.S. Pat. No. 6,748,183 discloses a system that includes a printer having at least one container for storing a consumable and a monitor for monitoring the status of the consumable in the at least one container; a host device for sending a print job to the printer, wherein the host device includes a display; and a printer driver for controlling operation of the printer from the host device, for querying the printer for consumable status information, and for providing a user interface in the host device display; wherein the printer driver, responsive to the print job, queries the printer for consumable status information and displays the status of the consumable in the at least one container in the printer in the user interface.

SUMMARY

Aspects of present systems and methods provide a system that includes an electronic device driver having a plurality of electronic device options and having an electronic device feature related to at least two current conditions of a the plurality of electronic device options; and an electronic device driver configured to communicate with the electronic device to determine the at least two current electronic device option conditions and to use the at least two electronic device option current conditions to provide information about the related electronic device feature.

In one aspect, a system includes a printer having a plurality of printer options and having a printer feature related to at least two current conditions of a the plurality of printer options; and a printer driver configured to communicate with the printer to determine the at least two current printer option conditions and to use the at least two printer option current conditions to provide information about the related printer feature.

In another aspect, a method includes displaying, at a video monitor electronically linked to a host computer, a user interface that enables a host computer user to operate an electronic device electronically linked to the host computer; querying the electronic device for a current condition of a plurality of electronic device options; detecting at least two of the electronic device option conditions; and using the at least two detected electronic device option conditions to make information about a electronic device feature available to a host computer user.

DETAILED DESCRIPTION

Figure 1:
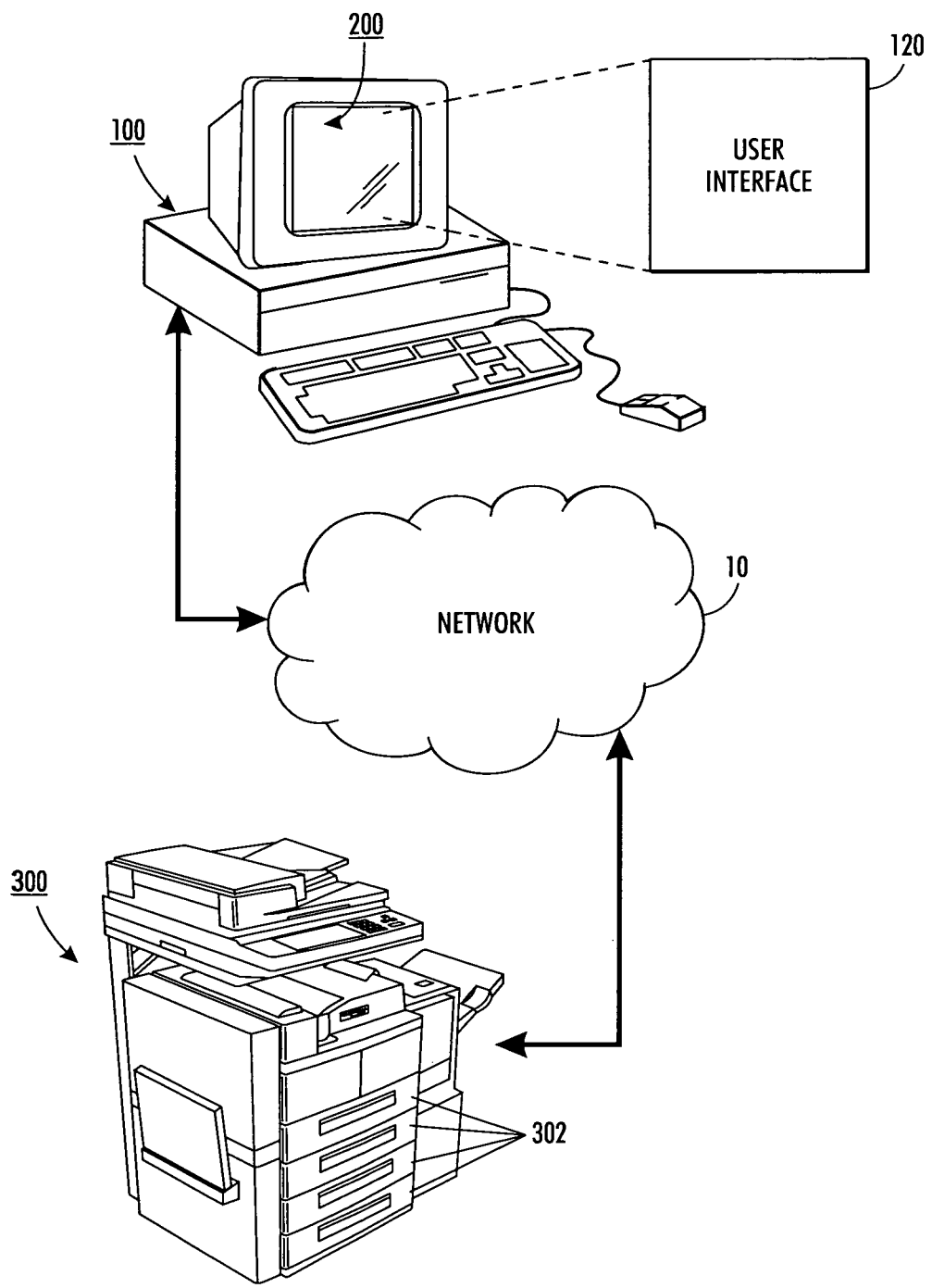
FIG. 1 provides one example of a computer network with a host computer that has a device driver that enables users to obtain information about electronic device features.

For a general understanding of the present systems and methods, reference is made to the drawings, in which like reference numerals have been used throughout. The following term(s) have been used herein to describe present systems and methods:

A "device driver" is a set of instructions issued from a host computer to control an electronically linked device.

A "device option" is a single parameter element of an electronic device, whose operation is controlled by modifying a setting. For example, one printer option may be modified to select media type, while another printer option is modified to select media size and still another printer option is modified to select media orientation.

A "feature" is an integrated tool that provides enhanced functionality by controlling combinations of electronic device elements. For example, a "landscape print" feature may combine a paper size selection with one or more image adjustment options.

Turning to FIG. 1, system 10 includes a host computer 100 in electronic communication with a video display 200 and a printer 300. While present systems and methods are described with reference to the system 10 illustrated in FIG. 1, it is understood that other arrangements are possible. For example, system 10 may include additional host computers and/or workstations as well as one or more scanning, facsimile, multifunction and/or other electronic devices. It is also understood that host computer 100 and the electronic devices could be directly connected via USB or parallel port or in some other suitable manner, rather than via a network.

In the example shown, printer 300 includes trays 302 where paper, transparencies and other media can be stored. Printer 300 will typically also have marking material, staples and other consumable items stored in other containers, and both the media trays and consumable containers are usually equipped with sensors, monitors, etc., that monitor the status of the contents thereof. For example, printer 300 may be configured to monitor the volume of paper, toner and other items remaining in the container and/or to detect whether a tray or container is open or closed.

One or more electronic drivers are typically stored in the memory of host computer 100 for controlling the available electronic device. For example, in one aspect, a printer driver 110 is stored in the memory of host computer 100. When executed, printer driver 110 causes a user interface 120 to be presented on video display 200 where users can enter control commands to operate printer 300. Using these control commands, users can select among the available options and features and enter the appropriate parameter settings.

Figure 2:
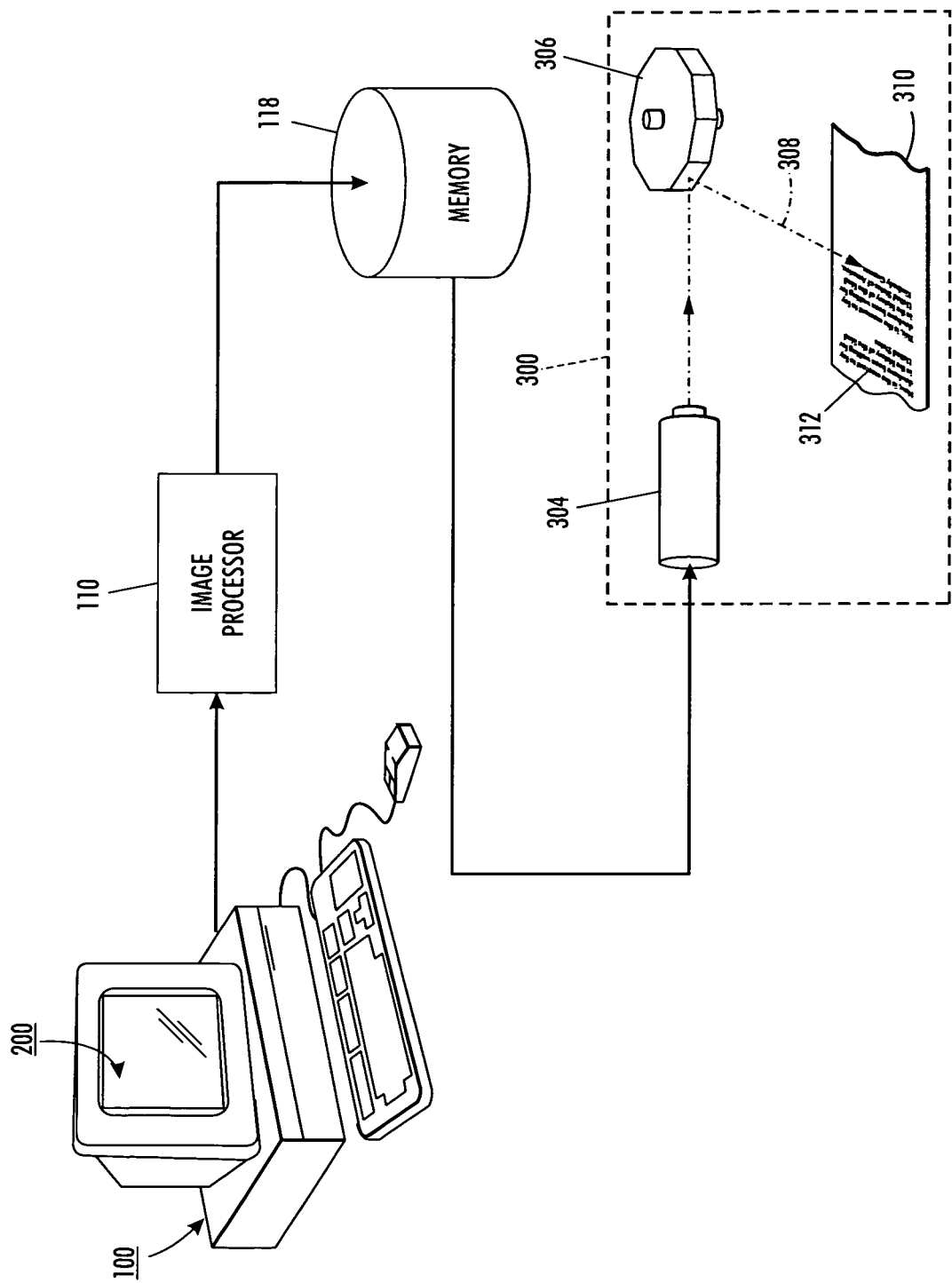
FIG. 2 is a block diagram showing one example of a digital image processor communicating with a digital printer.

Turning to FIG. 2, an image processor (IP) 110 inside host computer 100 is provided for processing digital image data to provide viewable output. Quite often, this digital image data will be created by a user operating a word processor, graphics or other application program. Generally, IP 110 analyzes the image data to identify its content, optimizes it based upon the identified content and desired application and converts it to an appropriate output format. For example, when the image data will be printed, IP 110 may convert it to Page Description language ("PDL") or some other known printer format and either store it in a memory 118 or transmit it directly to printer 300.

Figure 3:
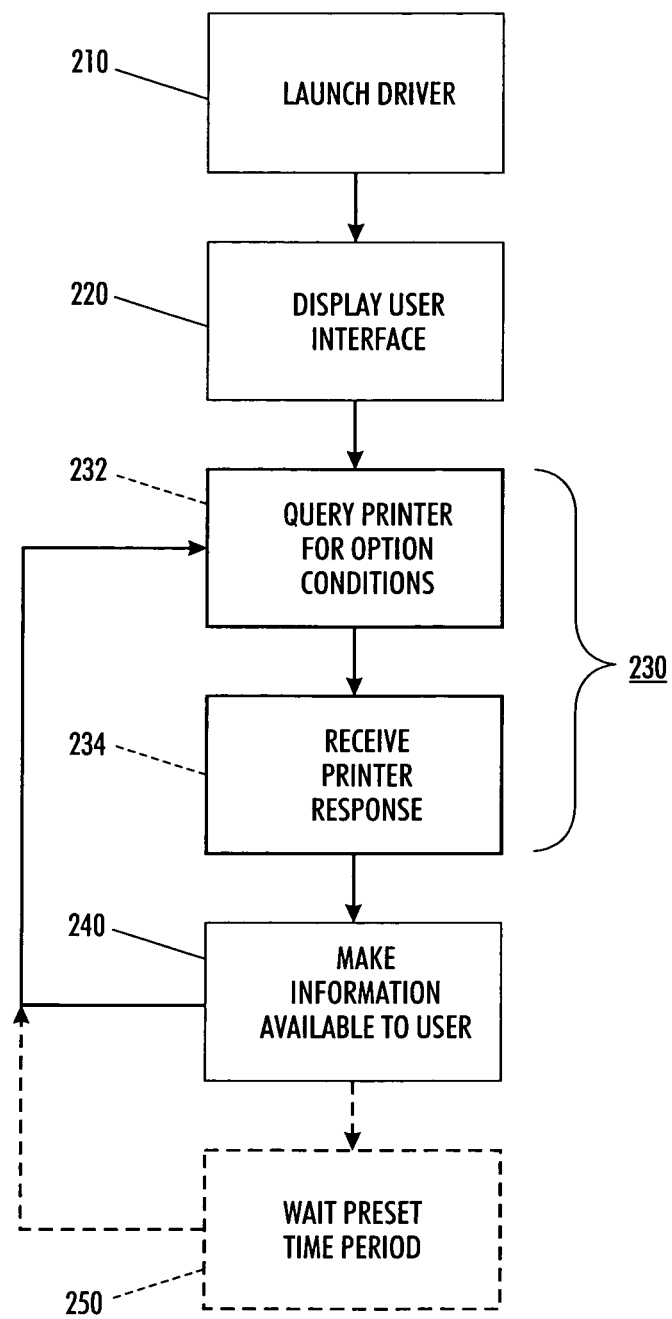
FIG. 3 is a flow diagram showing a procedure for obtaining the condition of one or more device options from an electronic device.

FIG. 3 provides an example of a process for operating a printer driver 110. Printer driver is executed at block 210, causing a user interface 120 to be automatically displayed on video monitor 200 as shown in block 220. In one aspect, present systems and methods provide a printer driver 100 that is configured to detect the current condition of options that are available to printer 300 using a process such as that highlighted by bracket 230. The detected condition of any options may then be processed by printer driver 110 and information about the printer options and features may be made available at user interface 120 as indicated in block 240.

In one aspect, device option conditions may be detected in a process 230 that has available options defined by "objects," each of which has a unique "object identifier" and a value that identifies its current state (based upon status monitor information). Conditions may be detected, for example, using a query routine that transmits one or more object identifiers to printer 300 as indicated in block 232 and receives a value assigned to the object as indicated in block 234, which identifies the current condition of the associated printer options.

In another aspect, a device 300 may have all of the available device options and their current states stored in a "device options file" that is formatted to share information over a network. For example, information in the device options file could be encoded using Extensible Markup Language (XML), which is widely used to create common information formats and to share both the format and the data over the Internet and also over intranets and other networks. Printer driver 110 may then detect option conditions using a process 230 that queries device 300 at block 232 and receives the device options file at block 234.

It is also noted that option condition detection 230 may occur at any time. For example, in one aspect, printer driver 110 may be configured to request option conditions as soon as printer driver 110 is launched. In another aspect, printer driver 110 may be configured to obtain option conditions according to a predetermined and/or periodic schedule. As shown in FIG. 3, for example, printer driver 110 may include a timing mechanism and after the preset time period expires as shown in block 250, printer driver 100 may query printer 300 again at block 232.

In yet another aspect, printer driver 110 may be configured to obtain option conditions when a specified input is entered at user interface 120. For example, user interface 120 may include a link that a user can select to obtain option conditions.

In one aspect, present systems and methods provide an electronic device driver that makes "context sensitive" information about device features available at user interface 120. That is, present systems and methods can be used to obtain device feature information by combining information relating to the condition of two or more options and presenting the combined output at the user interface 120 where the user enters the commands that operate the feature.

Figure 4:
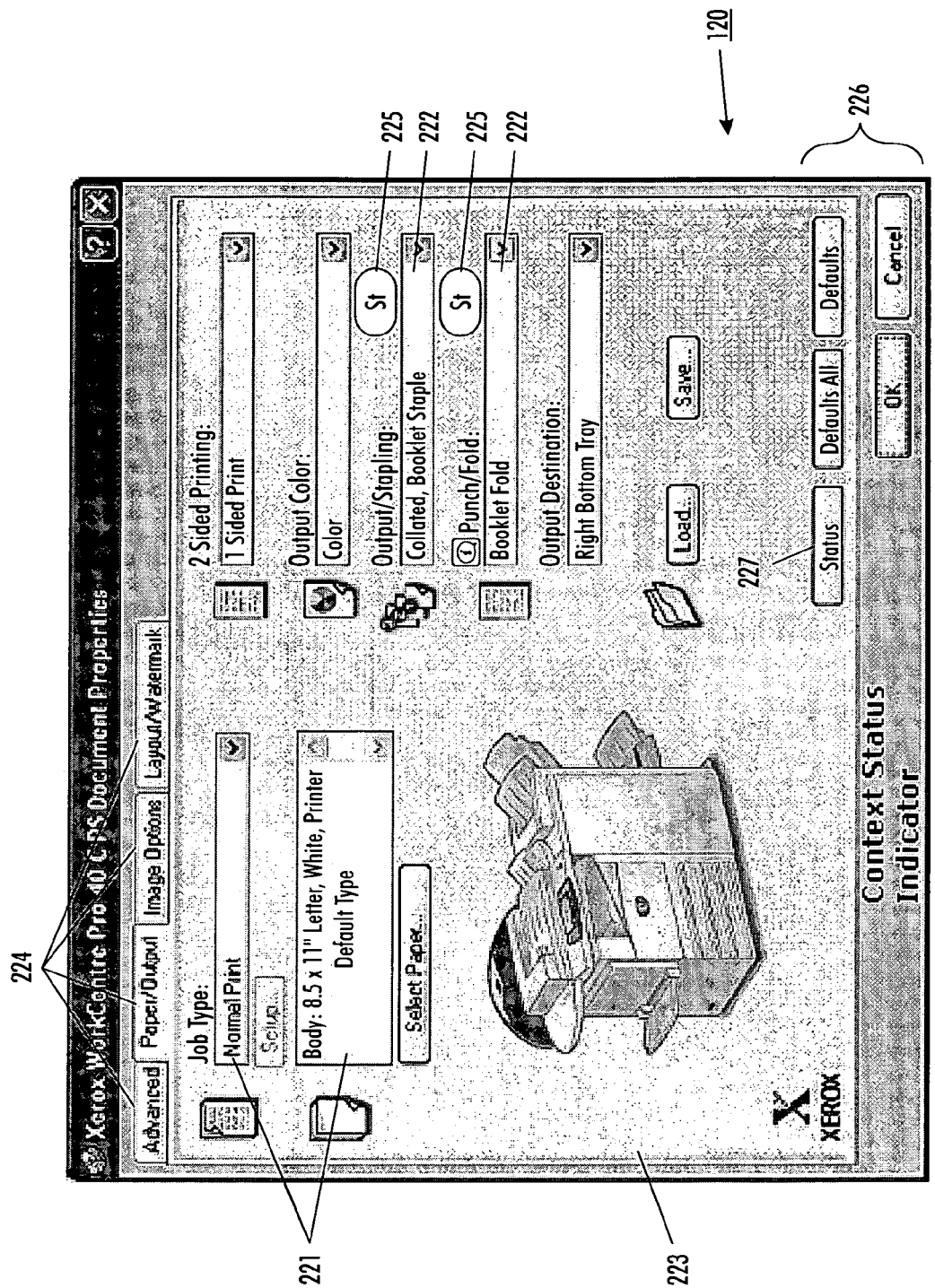
FIG. 4 provides an example of a printer driver user interface that provides context sensitive feature information.

Turning to FIG. 4, in one aspect, printer driver 110 presents user interface 120 as a series of overlaid sheets 223, wherein the associated tab 224 can be selected with the mouse or other suitable device to display the contents of each sheet 223. In the example shown, user interface 120 includes four (4) overlaid sheets 223, each of which is identified by a different tab 224. Generally, the text and graphics displayed on a given sheet 223 provide visual representations of the options 221 and features 222 that can be selected and controlled by entering commands at that sheet. In the example shown, the tab 224 for "Paper/Output" has been selected to display options 221 that control paper size and type selection, simplex or duplex printing and whether the output will print in color or monochrome. Paper/Output tab 224 also displays features 222 that control document finishing, such as collating, stapling, booklet printing and hole punching.

In one aspect, printer driver 110 automatically requests the condition of all of the available options from printer 300 as soon as the user selects tab 224 and printer driver 110 combines two or more conditions that are received from printer 300 to provide information about printer features 222. For example, printer 300 may provide a condition that identifies the size of the media in each tray, a condition that identifies the type of the media in each tray, a condition that identifies the orientation of the media in each tray and also a condition that indicates whether each image adjustment feature is available. Accordingly, if the only tray with conditions that match the size and type of paper selected by the user has a condition that identifies the paper orientation as "short feed direction" and the conditions of both the image reduction and rotation options is reported as "available," printer driver 110 may automatically determine that images can only be printed on the paper selected by the user by either rotating the input image by 90 degrees or reducing the input to some fraction of its original size. In either case, the derived information is made available at user interface 120.

Present systems and methods may enable the user to display the feature information in several ways. For example, in one aspect, feature information may be displayed at user interface 120 in response to a user input. In another aspect, printer driver 110 may cause a feature information indicator 225 to be automatically displayed at user interface 120 adjacent to each feature 222 for which information is available and the information may be displayed when the user points to or selects an information indicator 225 with the mouse or other device.

Still referring to FIG. 4, it is noted, that device drivers often have several options that are displayed on all of sheets 223. For example, the "OK," "Cancel," "Help," "Default" and/or "Default All" buttons that are displayed in section 226 apply the same commands to all of the options and features 222 to the options that are displayed on all sheets 223. In one aspect, present systems and methods may provide a "Status" button 227 that can be selected from any sheet 223 to turn the display of feature related information on and off. Thus, a user can display the feature information provided by printer driver 110 by selecting "Status" button 227, then providing another user input, such as positioning the mouse or other input device adjacent to or in some other position relative to the visual representation of the associated feature 222.

Figure 5:
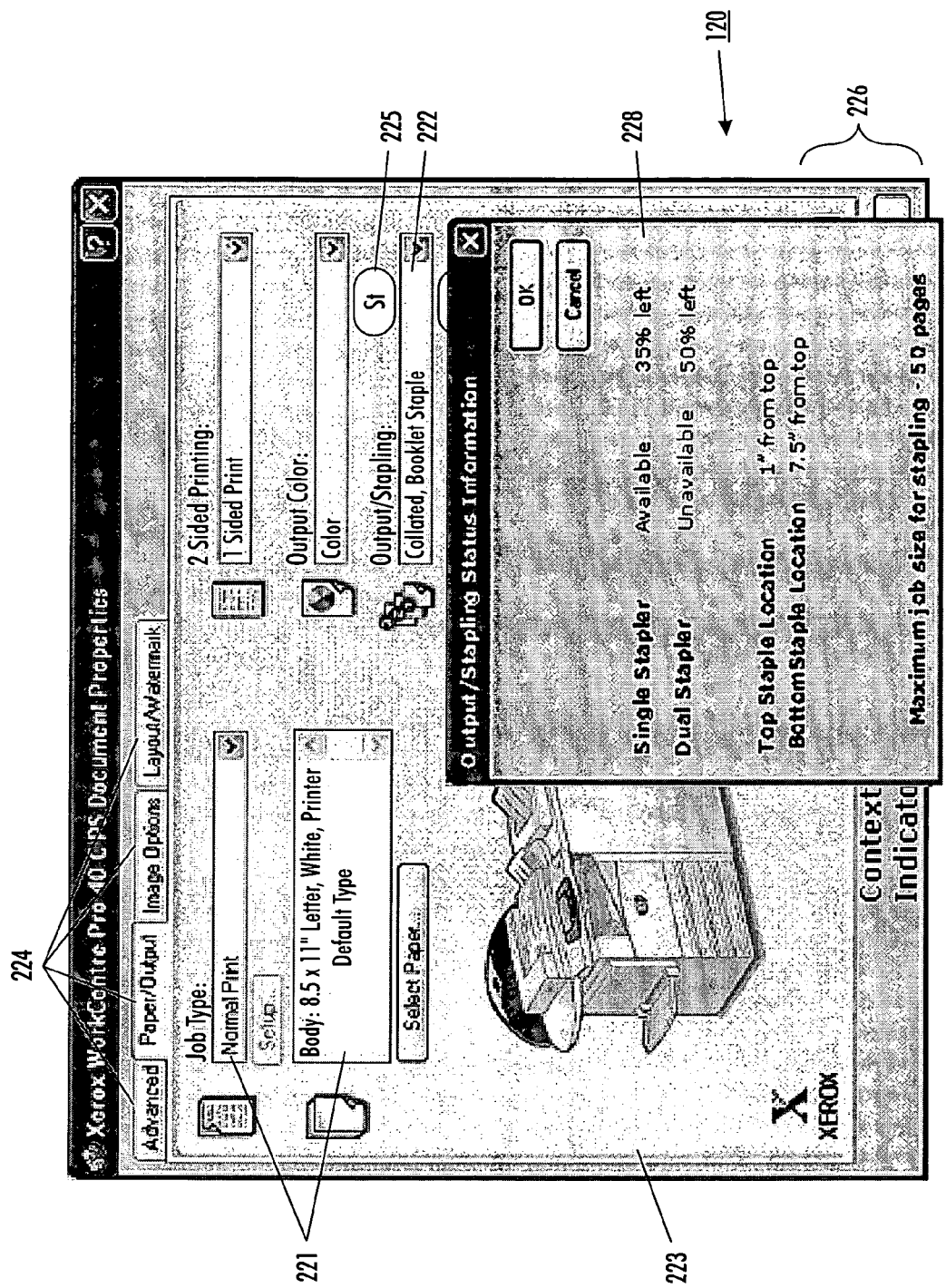
FIG. 5 shows an example of how context sensitive device feature information may be displayed in a user interface.

Turning to FIG. 5, feature information may be displayed in many ways, such as for example, as a balloon or pop-up window 228 that contains information in text and/or graphic form. It is noted that feature information may be any information that is available. For example, feature information may include information about an operating status and/or remaining capacity of the feature (e.g., "duplex=available" or "stapler=50% remaining"), it may include a request for action by the host computer user (e.g., please add heavyweight paper to tray 3"), or it may include text that explains how the settings will be modified in order to operate the feature or option (e.g., input image will be rotated by 90 degrees to perform the requested task"). Thus, present systems and methods enable users to obtain information about a device feature at the time they view the user interface to decide whether to use it. Accordingly, the user can select the options that will result in the most appropriate output for the intended purpose.

Present systems and methods can be used to provide conditions relating to device options and also, to provide status information for device features relating to multiple device options. Accordingly, user interface 120 can display numerous types of information. For example, printer driver 110 may simultaneously detect that the condition of a finisher stack tray is almost full (e.g., exceeds a predefined percentage of its maximum capacity) and that a condition of the selected media tray shows that its content is heavyweight paper, which causes it to provide finisher status information at user interface 120 indicating that finishing cannot be completed until the heavyweight paper in the available media tray is emptied.

Other examples of the type of feature status information that can be made available at user interface 120 include: if printer driver 110 detects that a finisher location can only supply paper arranged in the "short edge feed" direction (e.g., 11×8.5) and that the user has requested "long edge feed" paper LEF, the available print status may advise the user that the job will be rotated 90 degrees for printing; if printer driver detects that the volume of yellow toner is low, an image status may indicate that the output quality will be low or a message may be displayed indicating that the printed output will be "less yellow;" in a device 300 with four input trays, a printer driver 110 may detect that one tray is broken and that the requested job requires four different types of media and report that the user will have to load and unload paper in order to print the requested job.

Turning again to FIG. 2, once the desired features are selected, the user can submit the print request, and printer 300 will retrieve the image data from memory 118 and use it to modulate a light being emitted from light source 304 aimed at a raster output scanner (ROS) 306. Modulated light beam 308 is then directed onto the surface of uniformly charged imaging member 310, causing it to become discharged in the locations that receive light. Toner material 312 brought in contact with the selectively charged imaging member, adheres to the charged areas of the imaging member and the retained toner particles are transferred to a copy sheet and permanently fixed thereto. In other words, the binary data retrieved from memory 118 is transformed to markings that are printed on the output copy sheet. Again, while FIG. 2 shows the image data as being retrieved from memory 118, present systems and methods are not limited to printing data that has been stored.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system, comprising:
a printer having a plurality of printer options and having a printer feature related to at least two current conditions of the plurality of printer options;
a printer driver configured to communicate with the printer to determine the at least two current printer option conditions and to use the at least two printer option current conditions to provide information about the related printer feature; and
one or more status buttons located on a printer user interface, each of the one or more status buttons when selected prior to a print job being initiated causes the printer driver to display a status user interface window that shows status information concerning the printer feature, the status information being at least one of the at least two current printer option conditions related to the printer feature.

2. The system as claimed in claim 1, wherein the printer driver is further configured to determine the at least two printer option conditions by querying the printer for current information about the at least two printer option conditions.

3. The system as claimed in claim 1, further comprising:
a host computer; and
a video monitor electronically linked to the host computer;
with the printer driver being further configured to run on the host computer, to display the user interface on the video monitor and to make the printer feature information available at the user interface.

4. The system as claimed in claim 3, wherein the printer driver is further configured to control operation of the printer according to a host computer user input entered at the user interface.

5. The system as claimed in claim 4, wherein the user interface includes a visual representation of the printer feature and the printer driver is further configured to display the printer feature information in the user interface automatically in response to a host computer user interaction with the printer feature visual representation.

6. The system as claimed in claim 4, wherein the host computer user input includes positioning a cursor relative to the printer feature visual representation.

7. The system as claimed in claim 4, wherein the printer feature information includes a request for action by the host computer user.

8. The system as claimed in claim 4, wherein the printer feature information includes an explanation of a printer feature operation.

9. The system as claimed in claim 1, wherein the printer driver is further configured to display the printer feature information in the user interface in response to a selection of the feature information indicator by an input device in electronic communication with the host computer.

10. A system comprising:
an electronic device having a plurality of electronic device options and having an electronic device feature related to at least two current conditions of a the plurality of electronic device options; and
an electronic device driver configured to communicate with the electronic device to determine the at least two current electronic device option conditions and to use the at least two electronic device option current conditions to provide information about the related electronic device feature; and
one or more status buttons located on an electronic device user interface, each of the one or more status buttons when selected prior to a print job being initiated causes the electronic device driver to display a status user interface window that shows status information concerning the electronic device feature, the status information being at least one of the at least two current electronic device option conditions related to the electronic device feature.

11. A method, comprising:
displaying, at a video monitor electronically linked to a host computer, a user interface that enables a host computer user to operate an electronic device electronically linked to the host computer;
querying the electronic device for a current condition of a plurality of electronic device options;
detecting at least two of the electronic device option conditions; and
displaying one or more status buttons located on an electronic device user interface, each of the one or more status buttons when selected prior to a print job being initiated causes the electronic device driver to display a status user interface window that shows status information concerning the electronic device feature, the status information being at least one of the at least two current electronic device option conditions related to the electronic device feature.

12. The method as claimed in claim 11, wherein the electronic device is a printer having a plurality of printer options, with each printer option having a printer feature related to at least two current conditions of the plurality of printer options.

13. The method as claimed in claim 12, wherein the user interface includes a plurality of user interface screens, at least one of which includes a visual representation of the printer feature.

14. The method as claimed in claim 13, further comprising:
selecting one of the plurality of user interface screens;
automatically querying the printer for the printer option condition when the user interface screen is selected; and
making information about the printer feature available at the user interface.

15. The method as claimed in claim 13, further comprising displaying the printer feature information at the user interface in response to a positioning of a cursor relative to the printer feature visual representation.

16. The method as claimed in claim 15, wherein the host computer user interaction includes selecting the printer feature visual representation with an input device that communicates electronically with the host computer.

* * * * *